(12) United States Patent
Ko

(10) Patent No.: US 6,542,197 B1
(45) Date of Patent: Apr. 1, 2003

(54) THREE-DIMENSIONAL SIGNAL PROCESSOR USING MOTION INFORMATION UPON DECODING IMAGE SIGNAL

(75) Inventor: Do-young Ko, Anyang (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/334,628

(22) Filed: Jun. 17, 1999

(30) Foreign Application Priority Data

Jun. 23, 1998 (KR) ............................................ 98-23687

(51) Int. Cl.$^7$ ................................................ H04N 7/32
(52) U.S. Cl. ........................ 348/452; 348/451; 348/448; 348/699
(58) Field of Search ................................ 348/452, 451, 348/441, 446, 448, 699, 700, 416.1, 402.1, 43; 382/236, 233; 375/240.16, 240.25

(56) References Cited

U.S. PATENT DOCUMENTS

| | | | |
|---|---|---|---|
| 4,849,812 A | * 7/1989 | Borgers et al. | 348/400 |
| 5,410,358 A | * 4/1995 | Shackleton et al. | 348/459 |
| 5,488,422 A | * 1/1996 | Faroudja et al. | 348/448 |
| 5,598,215 A | * 1/1997 | Watanabe | 348/416 |
| 5,621,470 A | 4/1997 | Sid-Ahmed | 348/448 |
| 5,633,682 A | * 5/1997 | Tahara | 348/384 |
| 5,671,018 A | * 9/1997 | Ohara et al. | 348/452 |
| 5,838,381 A | * 11/1998 | Kasahara et al. | 348/458 |
| 5,959,681 A | * 9/1999 | Cho | 348/452 |
| 6,072,531 A | * 6/2000 | Shibano | 348/448 |
| 6,075,556 A | * 6/2000 | Urano et al. | 348/43 |
| 6,141,056 A | * 10/2000 | Westerman | 348/448 |
| 6,262,773 B1 | * 7/2001 | Westerman | 348/448 |
| 6,269,484 B1 | * 7/2001 | Simsic et al. | 725/151 |

FOREIGN PATENT DOCUMENTS

| | | | |
|---|---|---|---|
| EP | A2 0 388 187 | 9/1990 | G06F/15/70 |
| WO | WO 91/06066 | 5/1991 | G06F/15/70 |
| WO | WO 93/02529 | 2/1993 | H04N/7/137 |

* cited by examiner

*Primary Examiner*—John Miller
*Assistant Examiner*—Jean W. Désir
(74) *Attorney, Agent, or Firm*—Sughrue Mion, PLLC

(57) ABSTRACT

A three-dimensional signal processor for performing three-dimensional signal processing such as dual scanning/horizontal frequency conversion of a digital broadcasting signal, using a motion vector included in a decoded signal such that a special motion detecting block is not required. In this processor, three-dimensional signal processing is performed using motion information extracted during decoding, without using a special motion detection memory, thus reducing the manufacturing costs and providing accurate motion information from a transmitter. Therefore, the degradation of image quality can be prevented.

2 Claims, 4 Drawing Sheets

THREE-DIMENSIONAL SIGNAL PROCESSOR USING MOTION INFORMATION UPON DECODING IMAGE SIGNAL

BACKGROUND OF THE INVENTION

1. Field of the Invention

The present invention relates to a digital signal processor, and more particularly, to a three-dimensional signal processor using motion information during decoding of an image signal, for performing three-dimensional signal processing such as double scan/progressive scan conversion of a digital broadcasting signal, using a motion vector included in a decoded signal such that a special motion detecting block is not required.

2. Description of the Related Art

As shown in FIG. 1, in a signal processor having a decoding block 100A and a three-dimensional signal processing block 100B, a digital broadcasting signal according to the prior art is input to a digital signal receiver 11 via a transmission path (not shown). The digital signal receiver 11 performs channel coding of the digital signal for correcting errors introduced by the transmission path, and outputs a bit stream.

A digital signal decoder 12 performs source decoding for restoring an image signal, with respect to the error-corrected digital bit stream. In the source decoding process for restoring the image signal, it is determined from which portion of a previously processed picture image information should be brought in order to get the image information of a current macro_BLOCK, according to the motion information of a signal extracted by a motion information extractor 18. Data is read from a decoding memory 13 using the above-determined previous picture portion to perform forward prediction or bidirectional prediction, thereby restoring the image signal.

When 3-dimensional signal processing such as progressive scan conversion, double scan conversion, or the like is performed to improve the image quality of a restored image signal, movement is detected by a motion detection memory 16, and an algorithm for three-dimensional signal processing or how to apply a filter coefficient upon three-dimensional signal processing is determined. According to the above result of determination, corresponding three-dimensional signal processing is executed by a three-dimensional signal processing unit 14 associated with memory 15. This three-dimensional signal processed signal is finally converted into analog R, G, and B signals and displayed by a digital-to-analog (D/A) conversion and display unit 17.

According to the prior art as described above, in order to perform three-dimensional signal processing, the motion information of an image signal is detected using a special memory, and time base interpolation is adaptively performed according to the detected motion information. The motion detection requires a field/frame memory, thus increasing manufacturing costs. Also, motion detection information according to the prior art is not accurate, so that partial image quality degradation of an image signal occurs during the interpolation of a signal due to limitations in the capacity of a memory or the like.

SUMMARY OF THE INVENTION

To solve the above problems, it is an objective of the present invention to provide a three-dimensional signal processor using motion information extracted during decoding of an image signal, for extracting motion information using a motion vector transmitted from a transmitter and performing three-dimensional signal processing using the extracted motion information.

Accordingly, to achieve the above objective, there is provided a three-dimensional signal processor using motion information extracted during the decoding of an image signal, for performing three-dimensional signal processing on an image signal received from a digital decoder, the processor comprising: a motion information extractor for extracting motion information from a transmitted motion vector when the digital decoder is decoding; and a three-dimensional signal processing unit for performing three-dimensional signal processing using motion information extracted by the motion information extractor.

BRIEF DESCRIPTION OF THE DRAWINGS

The above objective and advantage of the present invention will become more apparent by describing in detail a preferred embodiment thereof with reference to the attached drawings in which.

DESCRIPTION OF THE PREFERRED EMBODIMENT

Figure 1:
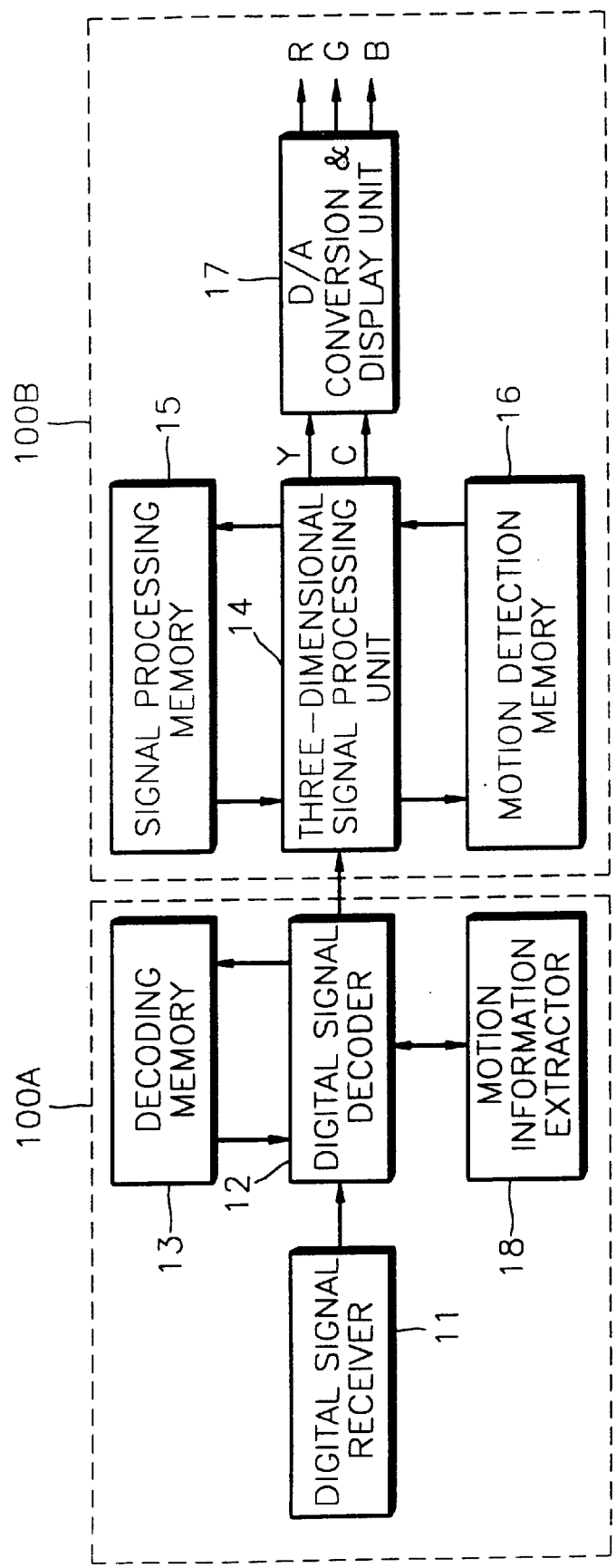
FIG. 1 is a block diagram illustrating the configuration of a conventional 3-dimensional signal processor.
Figure 2:
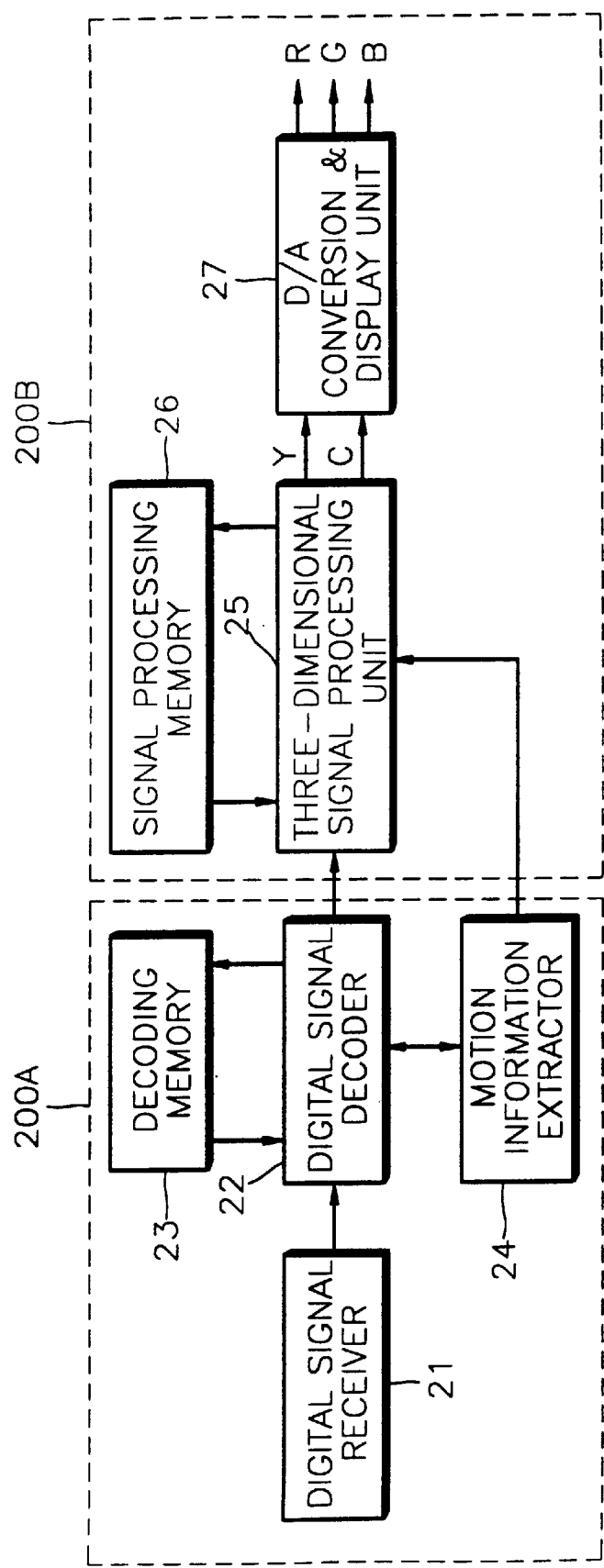
FIG. 2 is a block diagram illustrating the configuration of a 3-dimensional signal processor using motion information extracted upon decoding an image signal, according to the present invention.

As shown in FIG. 2, a three-dimensional signal processor, having a decoding block 200A and a three-dimensional signal processing block 200B, using motion information according to the present invention includes a digital signal receiver 21, a digital signal decoder 22, a decoding memory 23, a motion information extractor 24, a three-dimensional signal processing unit 25, a signal processing memory 26, and a digital-to-analog conversion and display unit 27.

Double scan conversion, progressive scan conversion, and three-dimensional noise removal are included in three-dimensional signal processing performed by the three-dimensional signal processing unit 25.

The double scan conversion is a method for doubling the vertical frequency of an image signal, and the progressive scan conversion is a method for doubling the horizontal frequency of an image signal.

The double scan conversion is a format conversion method for inserting a field signal interpolated using a motion vector between field signals and solving a flicker phenomenon by doubling the vertical frequency of an image, i.e., from 60 (50)Hz to 120 (100)Hz in an NTSC (or PAL) video broadcast standard.

The progressive scan conversion is a format conversion method for doubling the quality of an image by inserting a line signal interpolated using a motion vector between adjacent horizontal lines of a field signal and doubling the horizontal frequency of an image without changing the vertical frequency of the image signal.

Three-dimensional signal processing according to an embodiment of the present invention will be described by taking double scan conversion as an example for the convenience of explanation.

The digital signal receiver 21 receives a digital broadcasting signal via a transmission path (not shown), performs channel coding on the digital broadcasting signal to detect and correct errors introduced by the transmission path for the digital broadcasting signal, and outputs a digital bit stream.

The digital signal decoder 22 receives the digital bit stream, and performs source decoding on the digital bit stream to restore the non-coded image signal. In this source decoding process, it is determined from which portion of a previously-processed picture image information should be brought in order to get the image information of a current macro_BLOCK, according to the motion information included in the input digital bit stream signal. Thereafter, data is read from the decoding memory 23 using the above-determined previous picture portion to perform forward prediction or bidirectional prediction, thereby restoring the image signal.

Here, motion vectors are included in the image data input to the digital signal decoder 22, which are converted into motion scaler values on a per pixel basis by the motion information extractor 24. The motion scaler value for each pixel can be comprised of one bit or several bits according to the size of the motion vector. Also, information depending on the angle of the motion vector may be provided according to a three-dimensional application algorithm.

The extracted motion scaler values are input to the three-dimensional signal processing unit 25 to determine the generation amount of the motion of an image signal according to the time for three-dimensional signal processing. The generated motion amount determines a filter coefficient or a signal processing application algorithm in the three-dimensional signal processing for field/frame-unit image information stored in the signal processing memory 26.

Figure 3A:
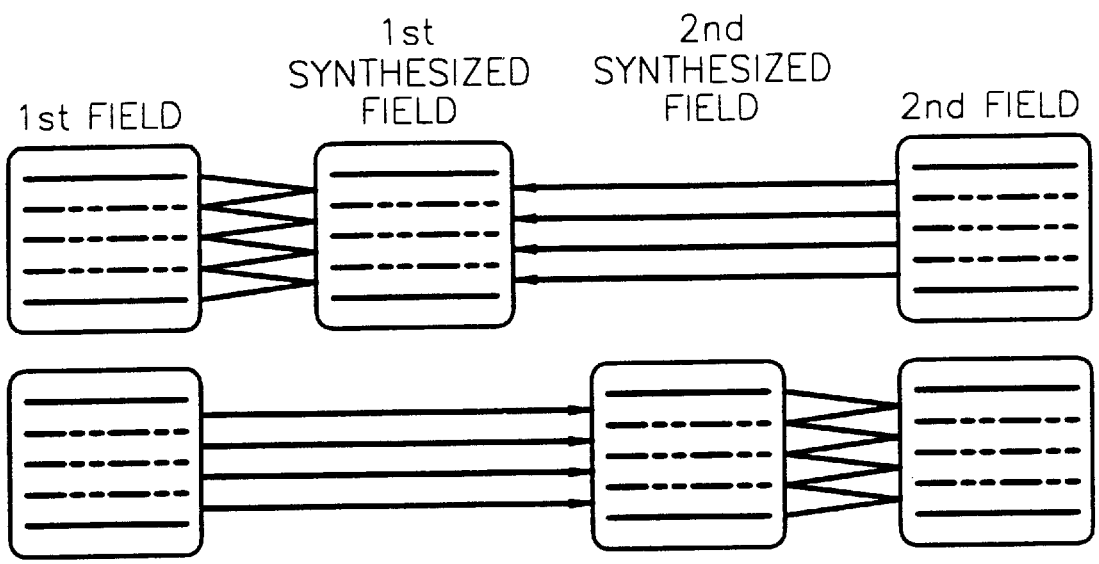
FIGS. 3A through 3C are views illustrating a field synthesizing method for three-dimensional signal processing for double scan conversion, to which the present invention is applied.
Figure 3B:
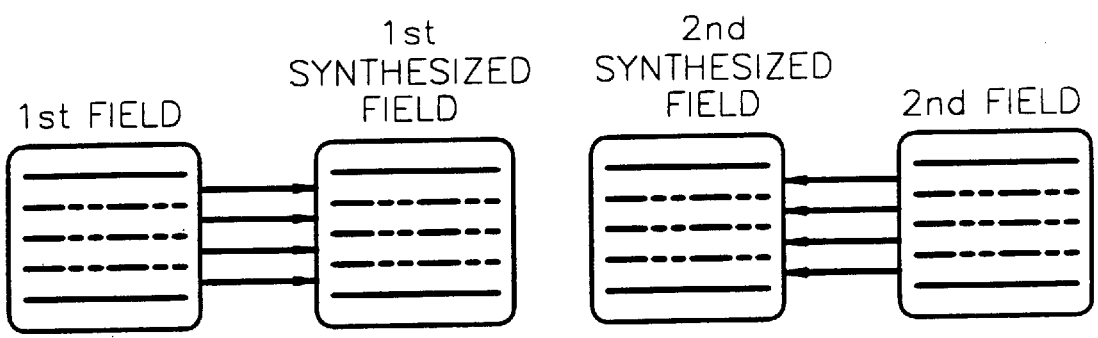
Figure 3C:
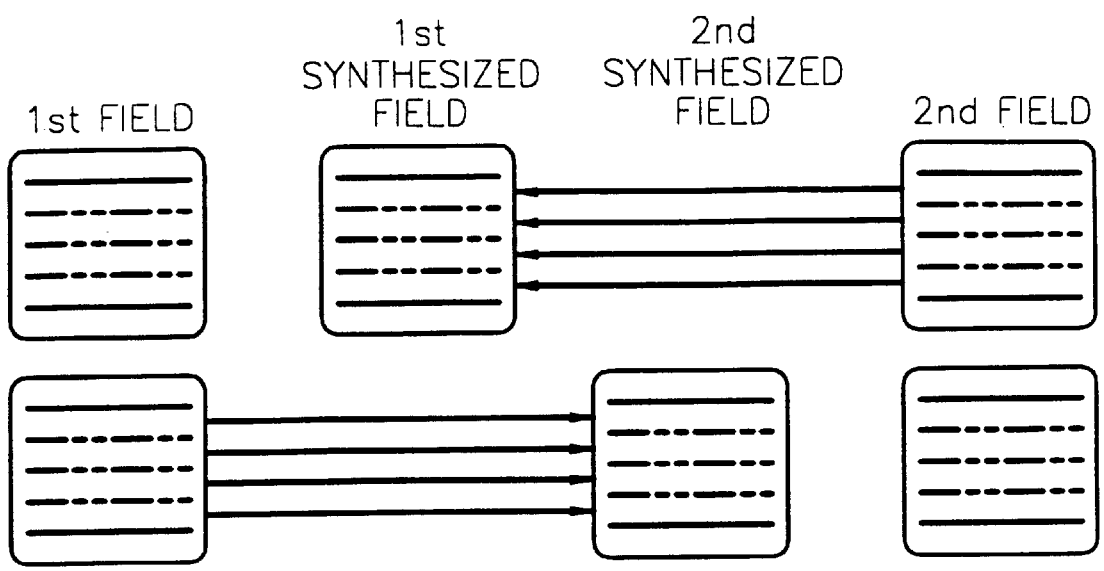

FIGS. 3A through 3C are views illustrating an application algorithm for doubling a vertical frequency using double scan conversion depending on the detected amount of motion. To be more specific, FIGS. 3A through 3C show an example of a field synthesizing method using interpolation in the following three cases in which: (1) the detected amount of motion is less than a minimum critical value; (2) the detected amount of motion is between the minimum critical value and a maximum critical value; or (3) the detected amount of motion is greater than the maximum critical value.

Firstly, when a motion scaler value detected by the motion information extractor 24 is smaller than the minimum critical value, the address of the signal processing memory 26 is designated so that among two field pictures to be interposed between first and second field pictures, picture data to be synthesized on the first field is brought from the picture data of the second field, and picture data to be synthesized to the second field is brought from the picture data of the first field, as shown in FIG. 3C. The field pictures are inserted by reading the second field data in the first field picture synthesis and reading the first field data in the second field picture synthesis to prevent the frequency characteristics due to interlaced scanning from being degraded in the case of no motion or a small amount of motion. Therefore, the field frequency is doubled.

Secondly, when a motion scaler value detected by the motion information extractor 24 is between the minimum critical value and the maximum critical value, the picture data of the first field is used as picture data to be synthesized on the first field, and the picture data of the second field is used as picture data to be synthesized on the second field, as shown in FIG. 3B, thereby doubling the field frequency. That is, the signal processing memory 26 reads and outputs identical field data twice in a field unit using a double-speed clock. In this case, since the motion is medium, the frequency characteristics due to interlaced scanning are not greatly reduced even when the picture of an identical field is repetitively inserted.

Thirdly, when a motion scaler value detected by the motion information extractor 24 is greater than the maximum critical value, a picture to be inserted into the first field is obtained by synthesizing the picture data of the first field with the picture data of the second field as shown in FIG. 3A. Here, the first field data is higher weighted than the second field data, and then they are synthesized. Also, a picture to be inserted into the second field is obtained by synthesizing the second field data having a higher weight than the first field data with the first field data.

In such a three-dimensionally processed image signal, the D/A conversion and display unit 27 converts a luminance signal Y and a color signal C into R, G, and B signals, converts them back into analog signals, and outputs and displays the analog signals to and on a display device (not shown) such as a cathode ray tube (CRT).

If the three-dimensional signal processing unit 25 performs progressive scan conversion, a frame or field memory is used as the signal processing memory 26. For example, when the motion scaler value detected by the motion information extractor 24 is smaller than a critical value, infra-frame or inter-frame processing is performed using the frame memory, and when the motion scaler value is greater than the critical value, intra-field processing is performed.

In the three-dimensional signal processing of a decoded image signal by such an operation, motion vector information is detected from a signal received from a decoding block without a special motion detection memory, thereby determining an application algorithm.

The present invention describes application of dual scan conversion and the progressive scan conversion, but it can be applied to a conversion circuit of a TV signal into a PC signal standard and a scan_rate conversion circuit. It is well known that the present invention can be applied even when a signal format is changed by software.

According to the present invention as described above, motion information is extracted using a motion vector instead of a special motion detection memory during decoding, and the extracted motion information is used for three-dimensional signal processing. Therefore, the manufacturing costs are reduced, and accurate motion information from a transmitter can be used, thereby preventing the degradation of the quality of an image.

What is claimed is:

1. A three-dimensional signal processor using the motion information extracted during the decoding of the image signal for performing three-dimensional signal processing on an image signal received from a digital decoder, the processor comprising:

a motion information extractor which extracts motion information from a transmitted motion vector when the digital decoder is decoding; and a three-dimensional signal processing unit which performs three-dimensional signal processing using the motion information extracted by the motion information extractor, wherein the three-dimensional signal processor performs a double scan conversion in first and second fields constituting a unit frame such that when the size of the motion information is smaller than a minimum critical value, picture data to be synthesized on the first field is produced by reading the picture data of the second field, and picture data to be synthesized on the second field is produced by reading the picture data of the first field, when the size of the motion information is between the minimum critical value and a maximum critical value, the picture data to be synthesized on each of the first and second fields is produced by repetitively reading the picture data of each of the first and second fields, and when the size of the motion information is greater than the maximum critical value, the picture data to be synthesized on each of the first and second fields is obtained by synthesizing the first picture data and the second picture data.

2. The three-dimensional signal processor using the motion information extracted during the decoding of the image signal as claimed in claim 1, wherein when the size of the motion information is greater than the maximum critical value, a picture to be inserted into the first field is obtained by synthesizing the first field data having a higher weight than the second field data with the second field data, and a picture to be inserted into the second field is obtained by synthesizing the second field data having a higher weight than the first field data with the first field data.

* * * * *